United States Patent
Zoppas

(10) Patent No.: US 6,422,379 B1
(45) Date of Patent: Jul. 23, 2002

(54) APPARATUS FOR CONTINUOUSLY TRANSFERRING ORDERLY SEQUENCES OF PREFORMS OF THERMOPLASTIC MATERIALS

(75) Inventor: Matteo Zoppas, Fontanafredda (IT)

(73) Assignee: SIPA S.p.A. (TV)

( * ) Notice: Subject to any disclaimer, the term of this patent is extended or adjusted under 35 U.S.C. 154(b) by 0 days.

(21) Appl. No.: 09/701,612

(22) PCT Filed: May 21, 1999

(86) PCT No.: PCT/EP99/03507

§ 371 (c)(1),
(2), (4) Date: Jan. 26, 2001

(87) PCT Pub. No.: WO99/62693

PCT Pub. Date: Dec. 9, 1999

(30) Foreign Application Priority Data

Jun. 1, 1998 (IT) ......................................... PN98A0039

(51) Int. Cl.⁷ ............................................. B65G 47/34
(52) U.S. Cl. .................. 198/803.12; 198/812; 425/534; 425/DIG. 108

(58) Field of Search ......................... 198/377.01, 487.1, 198/803.12, 812; 425/534, DIG. 108

(56) References Cited

U.S. PATENT DOCUMENTS

| | | | | |
|---|---|---|---|---|
| 2,548,683 A | * | 4/1951 | Remington et al. .... | 198/803.12 |
| 3,955,496 A | * | 5/1976 | Urban ................... | 198/803.12 |
| 4,693,375 A | | 9/1987 | Schweers | |
| 5,116,217 A | | 5/1992 | Evrard et al. | |
| 5,857,562 A | * | 1/1999 | Evrard ................... | 198/803.12 |

FOREIGN PATENT DOCUMENTS

EP          0846545 A      6/1998

* cited by examiner

*Primary Examiner*—Joseph E. Valenza
(74) *Attorney, Agent, or Firm*—Wenderoth, Lind & Ponack, L.L.P.

(57) ABSTRACT

An apparatus for continuously transferring orderly sequences of preforms includes a closed-loop conveyor belt and a plurality of support and forward carrying elements. A loading station is provided for loading the preforms, while an unloading station is provided for separating the preforms from the elements. A temperature conditioning station is provided between the loading station and unloading station.

27 Claims, 16 Drawing Sheets

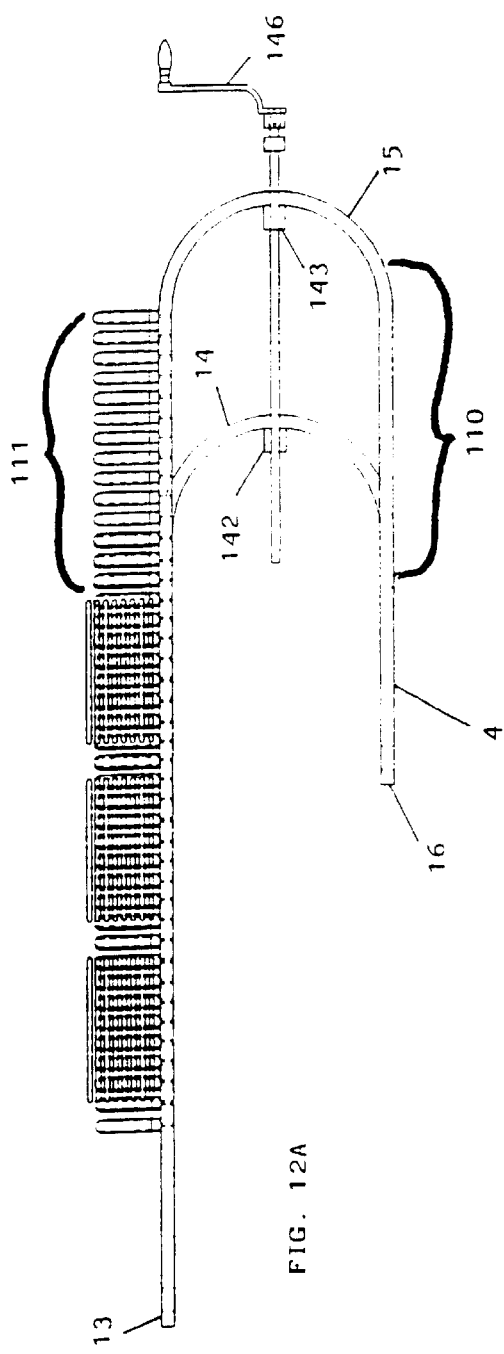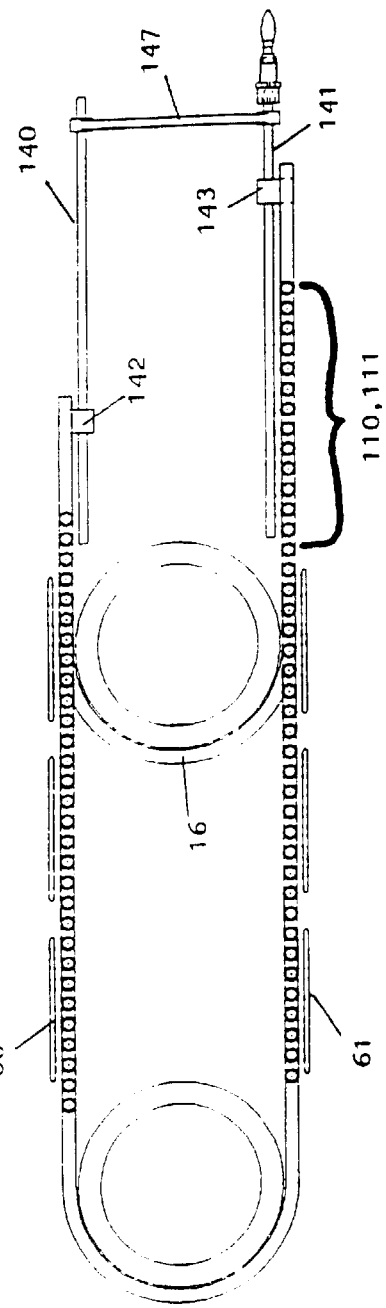
FIG. 12A
FIG. 12B

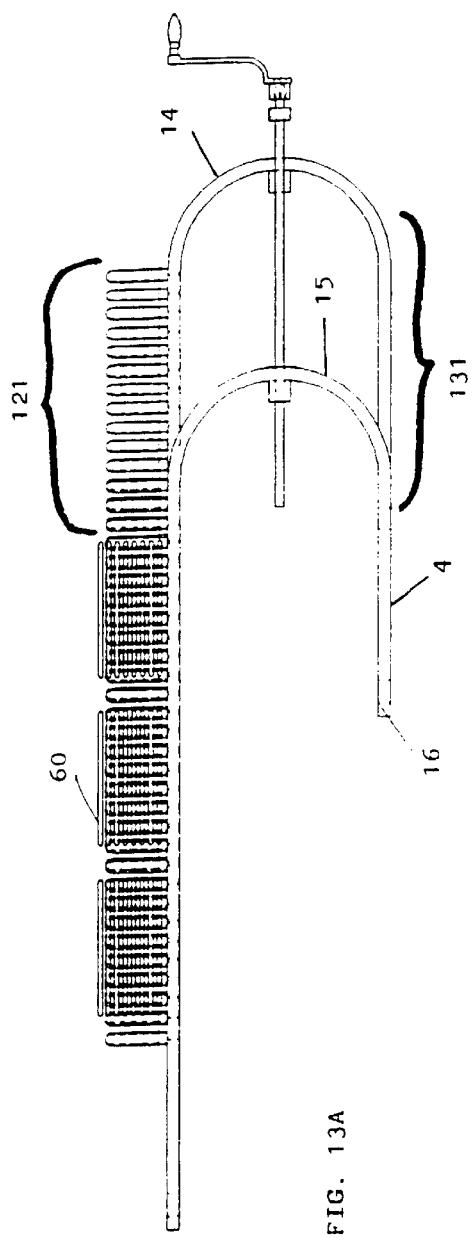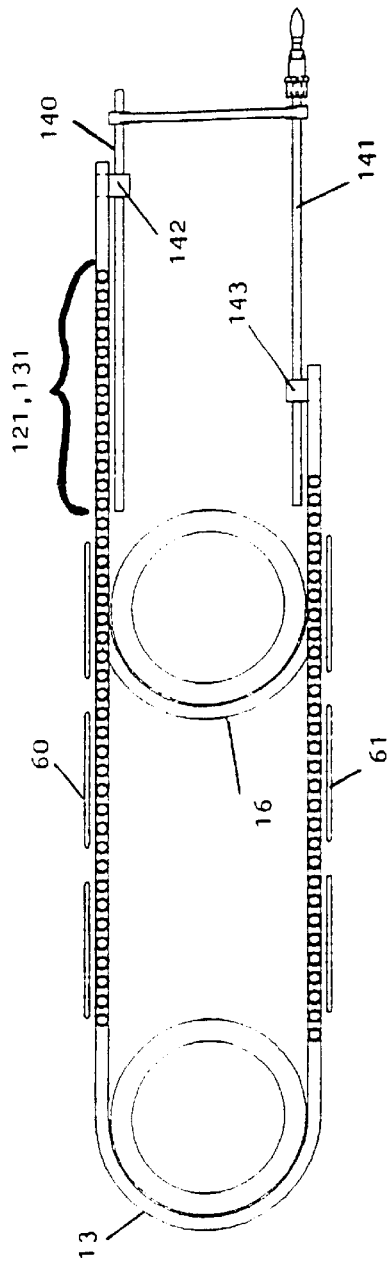
FIG. 13A
FIG. 13B

APPARATUS FOR CONTINUOUSLY TRANSFERRING ORDERLY SEQUENCES OF PREFORMS OF THERMOPLASTIC MATERIALS

BACKGROUND OF THE INVENTION

The present invention refers to an improved apparatus for handling, on a large-scale basis and in an orderly sequential manner, preforms made of thermoplastic material, in particular polyethylene terephtalate (PET) and polypropylene (PP), adapted to be blow-moulded for conversion into finished containers.

In particular, the present invention can be used in a most advantageous manner when the described apparatus is associated with an integrated type of production plant (i.e. a plant that is also known in the art as a single-stage plant), but can of course also be effectively used in connection with plants that are fed with previously produced preforms to only carry out the final blow-moulding phase (two-stage plants).

As a matter of fact, these processes for the production of such types of containers are generally known to be able to be schematically divided into two basic topologies, i.e., single-stage and two-stage processes.

In two-stage processes, a previously moulded preform or parison in a substantially amorphous state is heated up again to its preferred molecular orientation temperature, at which it is then blow-moulded to the desired shape. As used in this particular context, the term "two-stage process", or simply "two-stage", is intended to mean any process that produces a preform or panson which must subsequently be heated up again from ambient temperature to the respective blow-moulding temperature.

On the contrary, single-stage processes are so defined due to the fact that they are capable of moulding the so-called preform or parison, and transferring the same preform or parison from the injection or extrusion mould (after it has cooled down to some appropriate temperature) to a conditioning station where the preform or parison is allowed to evenly cool down to a preferred molecular orientation temperature. The preform or parison a then transferred to a blow-moulding mould, where it is moulded into the desired shape.

Both above types of production methods involve the use of a (per se known) blow-moulding station and the therewith associated handling means for transferring and releasing the preforms and/or the blow-moulded containers after the blow-moulding phase. Both types of processes further share the feature of transferring the injection moulded or extruded preforms first to a conditioning and temperature-levelling station and then from this station to the actual blow moulding plant.

Such a transferring operation is usually carried out with the use of various techniques and according to various methods. In particular, this is carried out by contemporaneously transferring groups of preforms to the conditioning station and then, again in a synchronous manner, transferring them to the blow moulding unit where the group of preforms is processed simultaneously.

A different technique makes, on the contrary, use of the concept calling for a plurality of preforms to be first transferred in an orderly but sequential manner to the conditioning station, where they are treated by allowing them to move in a continuous manner through conditioning ovens or zones. After such a conditioning phase, the preforms are picked on a one-by-one basis and transferred into appropriate blow-moulding tools where they are eventually converted into finished containers with a similar process that is, however, appropriately set to follow an out-of-phase pattern from mould to mould according to the rate of arrival of the preforms. This second technique has some advantages from both a construction and an operational point of view, as anyone skilled in the art is well aware of, so that they shall not be reviewed here.

It, however, also has a typical drawback connected with the fact that the conditioning phase is particularly facilitated by the vertical position of the preform. However, with the neck portion thereof turned downwards for largely known reasons, mounting the preform on the means provided to transfer it first to the conditioning station and then to the blow moulding unit is on the contrary carried out with the preform that although in a vertical position, has its neck portion turned upwards. As a result, if use is made of a transferring means operating on a single plane, be it a vertical or horizontal one, a serious drawback is incurred in the conditioning phase the preforms undergo conditioning with their neck portion turned upwards. Alternatively, remarkable complications in the construction and, therefore, also the operation of the plant shall be created, with a clearly heavy impact on the overall economics thereof if preforms are transferred with their neck portion turned downwards.

Eloquent disclosures of such a technique making use of transferring means moving on a single plane are described in the following patent literature: U.S. Pat. No. 3,984,513, U.S. Pat. No. 4,362,498, WO 89/01400, WO 95/05933. U.S. Pat. No. 3,339,230, U.S. Pat. No. 4,354,813, U.S. Pat. No. 4,313,720. U.S. Pat. No. 4,850,850, EP 0 296 825, EP 0 425 360.

A general temperature conditioning plant for preforms is known from the patent publication FR 2 646 632 to SIDEL, which is used with devices that are capable of reversing the orientation of the preforms twice. Therefore, the same preforms end up eventually acquiring their initial orientation.

With such devices, the preforms which reach the temperature conditioning plant with their neck portion facing upwards are turned upside down, so that their neck portion is facing downwards. In such a position they are then subjected to temperature conditioning. After such a treatment they are again turned 180° so as to regain their initial position (i.e., with position with their neck portion facing upwards), which is more favorable in view of the subsequent handling thereof.

However, such devices, which comprise a helical guiding system and roller-type following members, turn out to be rather complicated and, therefore, expensive and inherently unreliable. This is because each preform must be provided with a single device capable of quickly reversing its position on an individual basis.

SUMMARY OF THE INVENTION

Based on the above considerations, it is therefore a main purpose of the present invention to provide an apparatus and a method of preform transferring and conditioning phases preceding the actual blow-moulding phase, in which the orientation of the preforms will be adjusted in the most effective, economical and reliable manner, while doing away with the above drawbacks. In addition, the invention is further capable of feeding the blow moulding plant in a continuous, automatic and orderly manner without any interposition of phases that may interrupt the continuity of the preform feeding flow. Furthermore, such an apparatus must be easily implemented with the use of readily available techniques and means and shall therefore be reasonably low in its overall costs.

Such main aim of the present invention, along with further features thereof, is reached in an apparatus that is made and operates as recited in the appended claims.

BRIEF DESCRIPTION OF THE DRAWINGS

The present invention may take the form of a preferred embodiment, such as the one described in detail below by way of a non-limiting example presented with reference to the companying drawings, in which:

FIGS. 12A, 12B and 12C are side, top and perspective views, respectively, of an apparatus according to an improvement of the present invention as shown in a particular operating state;

FIGS. 13A, 13B and 13C are side, top and perspective views, respectively, of the same apparatus appearing in the above cited Figures, but shown here in a different operating state.

Detailed Description of the Invention

The present invention is derived from the combination of a fixed closed-loop conveyor belt, which is adapted to constitute an appropriate transferring guide and whose orientation is defined on two distinct planes, and a chain capable of sliding along the conveyor belt and which is formed by a plurality of support and forward carrying elements engaged in the guide. On the chain, respective pick-up, accompanying and release members for respective preforms are rigidly applied.

Figure 1:
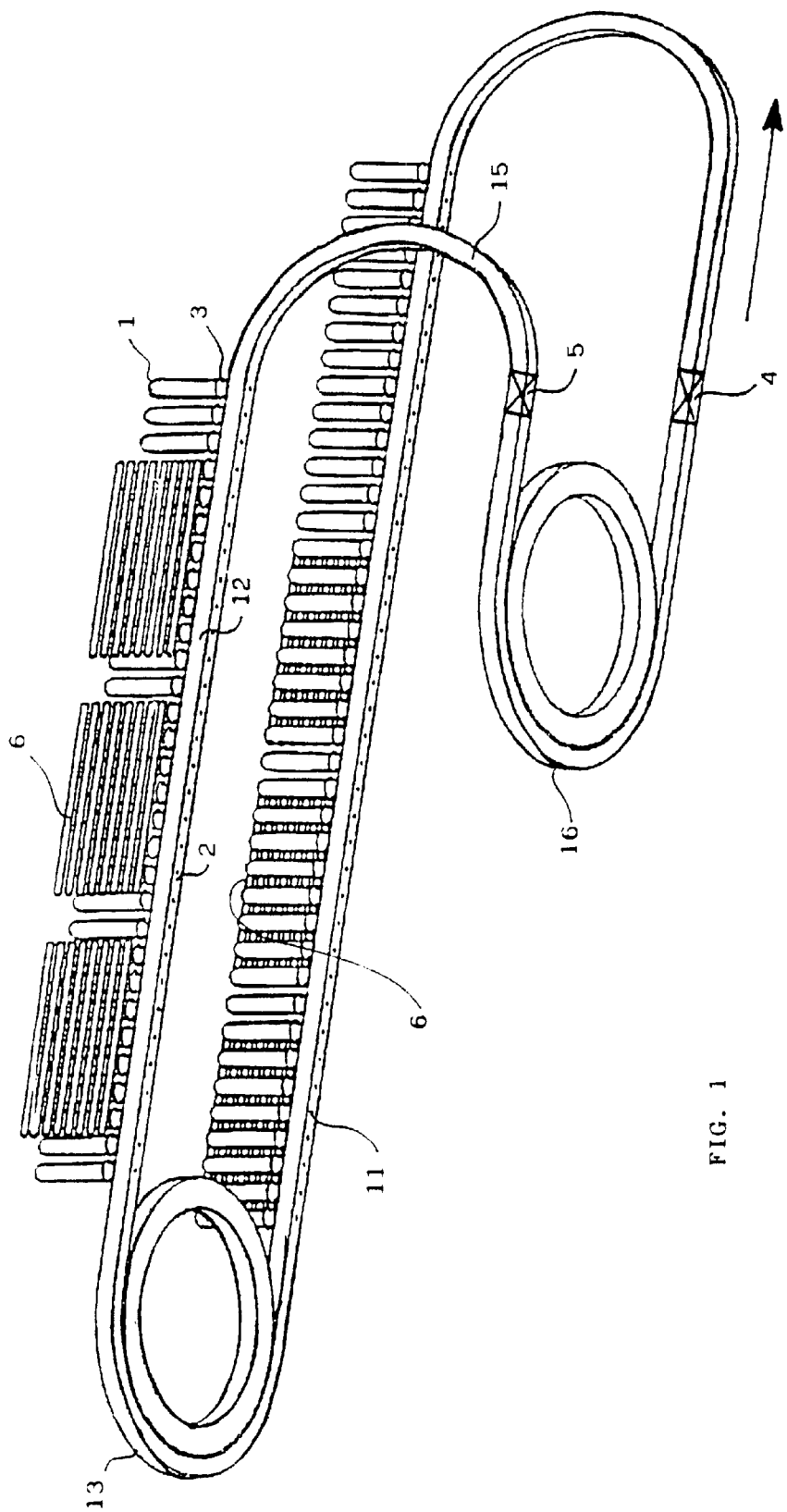
FIG. 1 is a schematical perspective view of an apparatus according to the invention.
Figure 2:
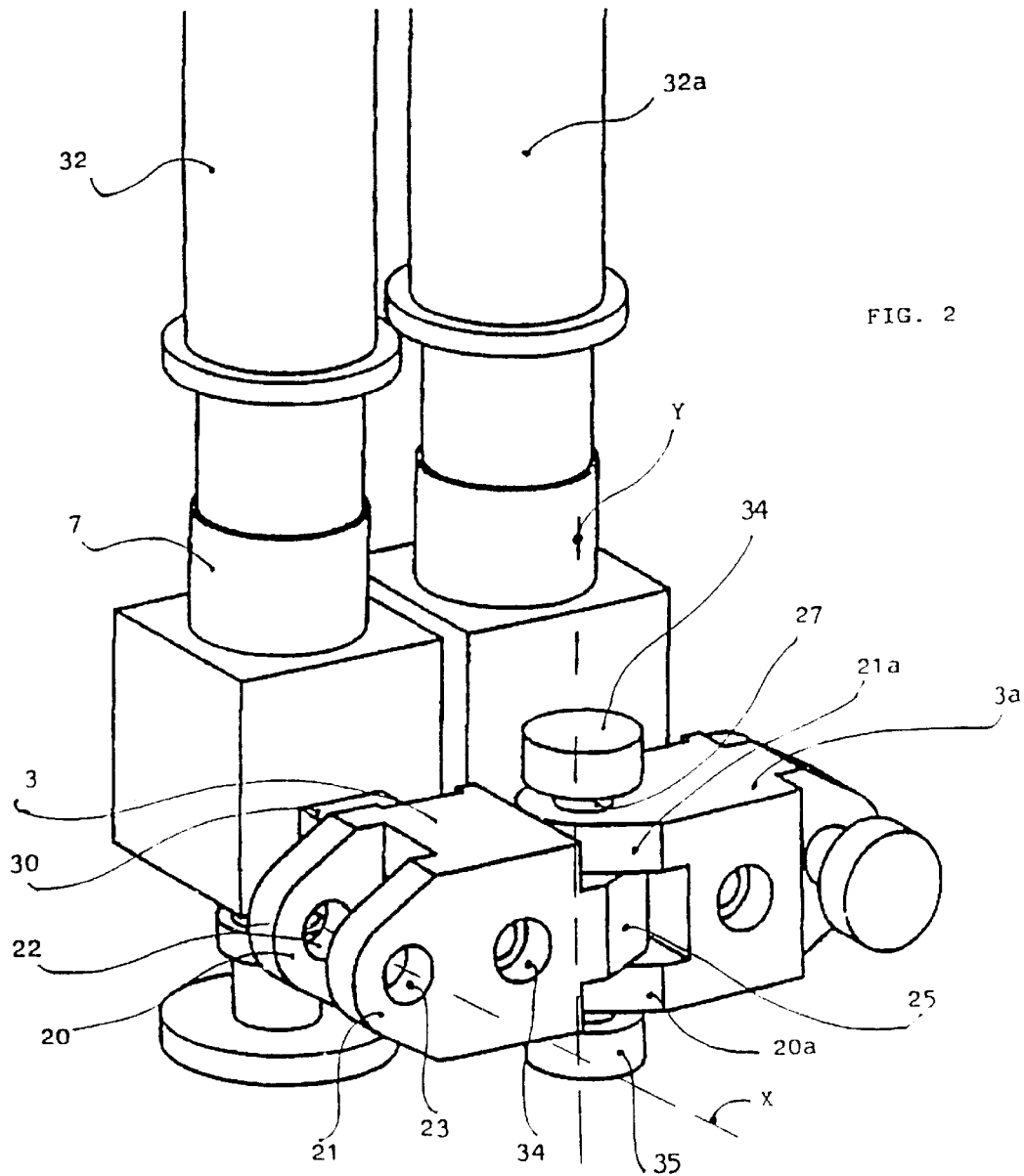
FIG. 2 is a schematical perspective view of two basic components of the invention, mutually connected as in a real-use situation.

With reference to FIGS. 1 and 2, these illustrate the conveyor or guide belt 2, on which there are mounted two support and forward carrying elements 3, 3a that shall be described in greater detail further on.

The configuration of the conveyor belt, which of course extends to form a closed-loop arrangement, and the elements constituting the chain allow for loading and unloading the preforms 1 associated with the elements 3, 3a to take place with the preforms in a vertical position with their neck portion turned upwards. However, the arrangement also allows the temperature conditioning phase to be carried out with the same preforms again in a vertical position, but with their neck portion turned downwards.

Such a result can be obtained if the belt is bent at a 180° angle at least in a portion thereof through a vertical plane. Consequently, a preform mounted vertically thereon with a certain orientation will again be in a vertical position after traveling through such a curvature, but will have the opposite orientation (i.e., it will be turned upside down).

FIG. 1 shows that such a result can, for example, be obtained if the belt 2 is formed by two there-and-back stretches (i.e., a delivery stretch 11 and a return stretch 12) extending on a horizontal plane and connected to each other by a curved stretch 13 arranged on the same horizontal plane. Corresponding to the stretches 11 and 12, there is provided at least a conditioning station 6, of a per se known kind, which heats up and possibly levels off the temperature of the preforms that are moving along the stretches and must therefore be oriented with their neck portion turned downwards. During this conditioning phase, the preforms are automatically caused to rotate about their axes along the vertical axis in order to better distribute the heating effect, bit this fact is largely known in the art and is not a part of the present invention.

On the opposite end of the apparatus from the curved stretch 13, the stretches 11 and 12 continue with two curvatures 14 and 5, respectively, which extend vertically downwards. Each curvature 14 and 15 comprises half a round angle (i.e., a 180° turn). At the end of the curvatures 14 and 15, the preforms, which remain attached to the belt with the aid of a component that will be described in greater detail further on, will each undergo a rotation by half a round angle (i.e., a 180° turn), so as to eventually assume an orientation with their neck portion turned upwards.

At this point, the two vertical stretches 14 and 15 can be joined to each other by an at least partially curved horizontal stretch 16 along which the loading station 4 and unloading station 5, for respectively loading and unloading the preforms onto and from the conveyor belt, can therefore be arranged. The preforms do not change their orientation when traveling through the curved horizontal stretch 16.

The two stretches 14 and 15 can, of course, be curved at their upper portion, instead of being so curved at their lower portion as shown in FIG. 1. It will be similarly appreciated that a number of other physical configurations are also possible using in all cases the teachings of the present invention. Since such configurations can be quite readily conceivable by those skilled in the art on the basis of these teachings, they shall not be illustrated here for the sake of brevity.

As far as the support and forward carrying elements 3, 3a and the therewith associated pick-up plugs 7 are concerned, reference should be made to FIG. 2, which is a perspective view of said elements 3 and 3a in a connected state. Reference in this regard should also be made to FIG. 3, which is a disaggregated view of some components of the present invention.

The support element 3 is constituted by a central body chat is provided, on one of the onward motion sides, with two parallel tabs 20 and 21 featuring two appropriate respective holes 22 and 23 arranged on the same axis X. On the opposite side of these tabs there is provided a protrusion 25 featuring a through-hole 26 that has its own axis Y orthogonal to said axis X. The architecture, the geometry and the dimensions of the first support element 3 are such that, when combined with a further second support element 3a similar to the first element 3, the tabs 20a and 21a of the second support element 3a define a niche adapted to accommodate the protrusion 25 of the first support element 3. A pin 27 is in turn capable of being engaged through through-hole 26 and the holes 22a and 23a provided in the respective tabs of the second support element 3a.

FIG. 2 illustrates a pair of contiguous support elements 3, 3a connected in series and necessarily rotated at 90° with respect to each other so as to allow for their mutual connection. The connection is obtained by protrusion 25 of one of the elements engaging a respective niche of the adjacent element. Such a method of connection of contiguous support elements to each other repeats itself in a similar manner in connection with all remaining support elements in the arrangement.

At this point, one skilled in the art is capable of readily appreciating that the elements 3, 3a can be connected in series so as to form a closed-loop chain that is capable of being driven (i.e., moved along an appropriate guide belt that can extend to develop into a three-dimensional path, in particular a path as illustrated in FIG. 1). The driving is accomplished by taking advantage of the circumstance that each support element 3 is capable of freely rotating by 90° with respect to an axis of an adjacent element 3a situated on a side thereof, and the circumstance that each support element 3 is also capable of freely rotating, again by 90°, about an axis that is orthogonal to the above-mentioned axis and belongs to a further adjacent support element situated on the other side of the element 3 with respect to the element 3a. Thus, a chain is obtained, in which each link or support element 3, is substantially similar to any other link. Adjacent links are mounted with a mutually orthogonal orientation, so that the chain is capable of being moved with respect to a guide belt extending along any three-dimensionally configured path.

Figure 6:
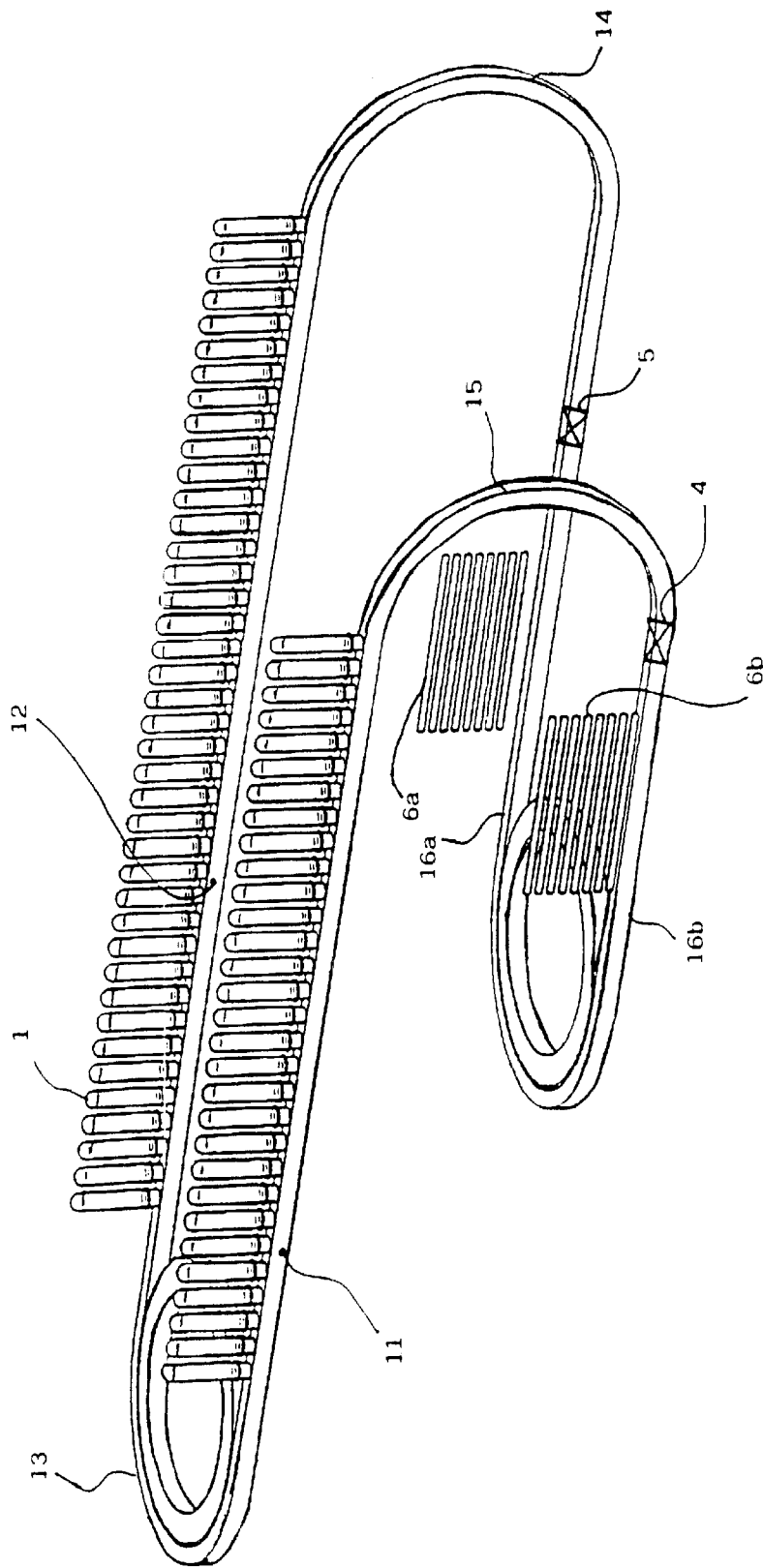
FIG. 6 is a schematical perspective view of an improvement of the apparatus illustrated in FIG. 1.
Figure 7:
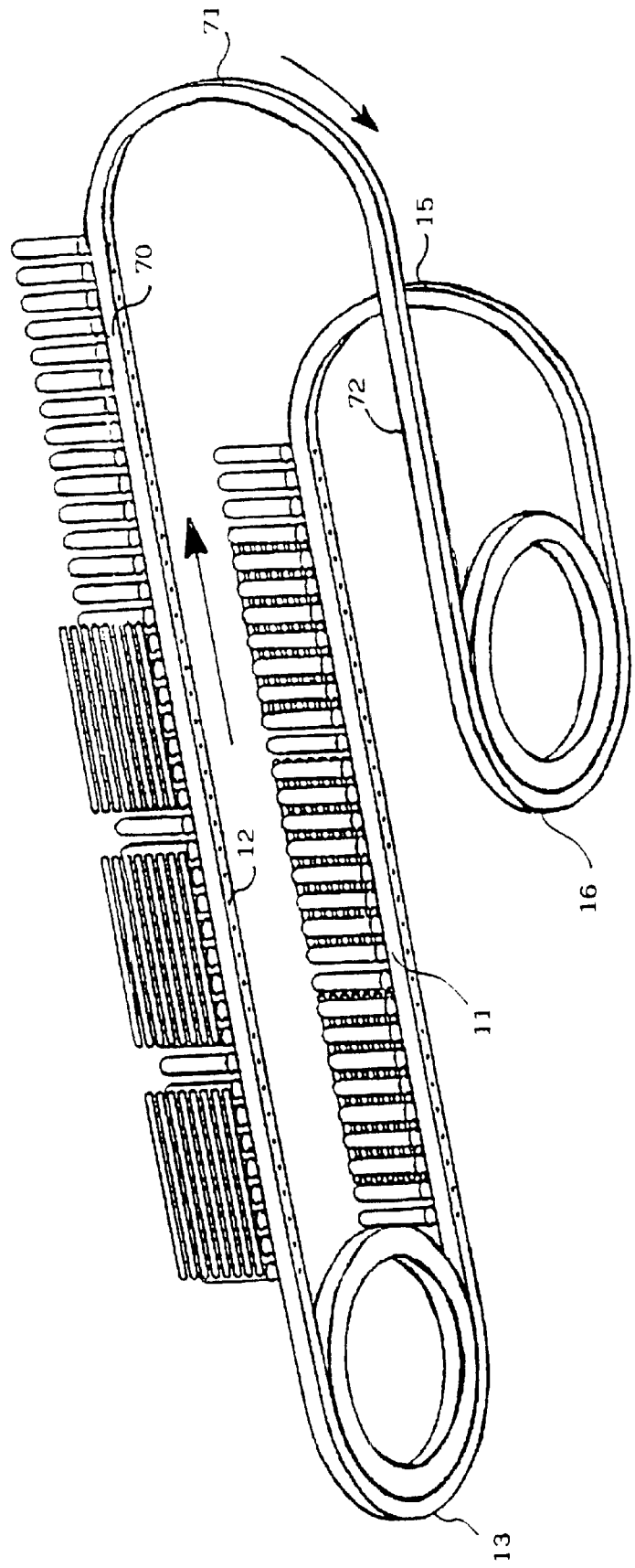
FIG. 7 is a schematical perspective view of a further improvement of the illustrated in FIG. 1.

In particular, such a chain is capable of sliding, and therefore being driven, along the belt illustrated in FIGS. 1, 6 or 7. For the chain to be used to accomplish the purposes of the present invention, each support element 3, 3a is provided with a respective fastening component 30, 30a which connects the support element to a so-called pick-up plug 31 and 31a or similar member capable of picking up, keeping in a defined position and finally releasing a respective preform 32, 32a. The technology of such pick-up plugs or similar means, the purpose thereof, their operation and use are well known in the art, so that they shall not be illustrated here.

Figure 3:
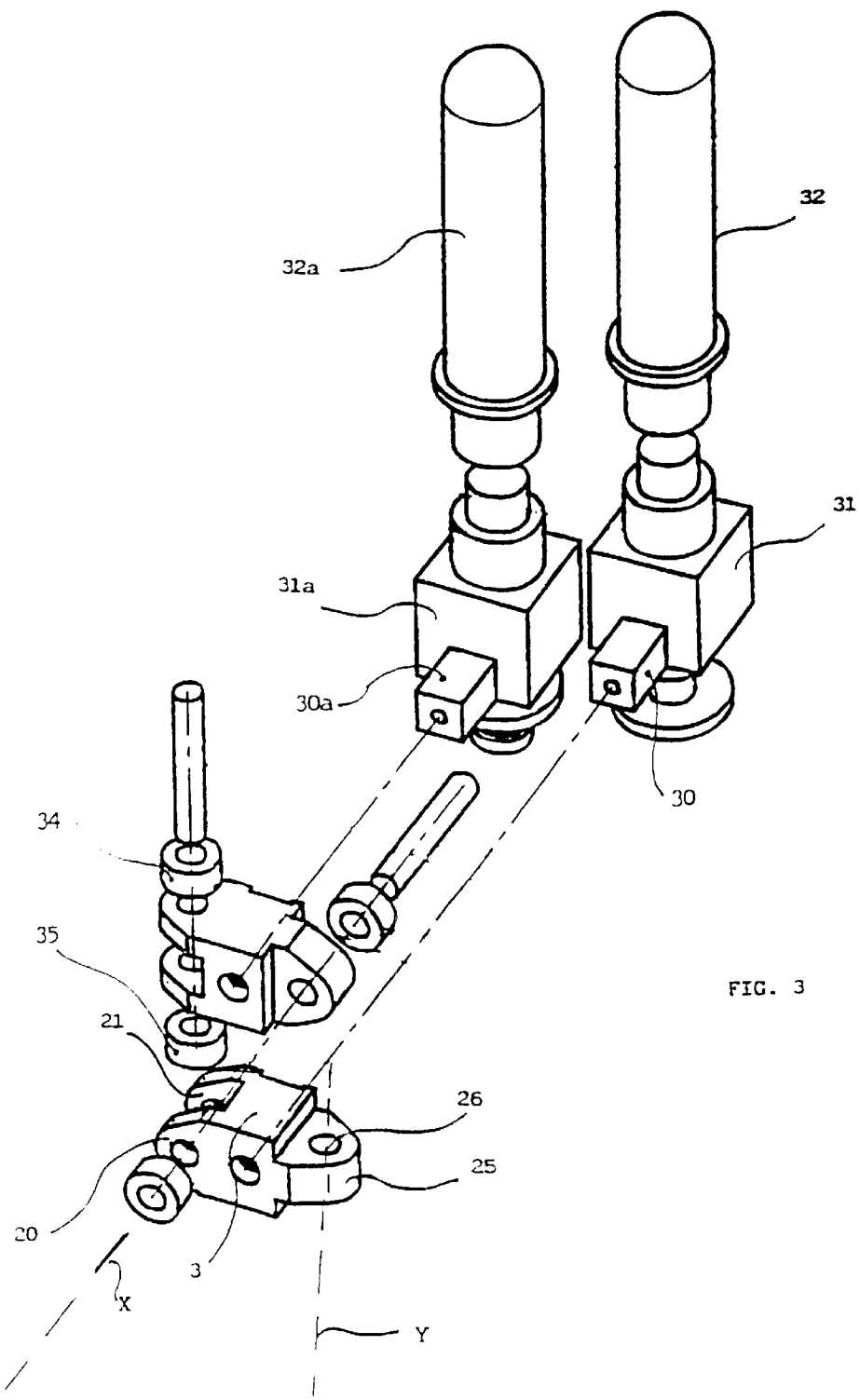
FIG. 3 is a perspective view of the same components of FIG. 2, but them in a condition to which they are disassociated from each other.

If such pick-up plugs are connected with respective support elements, possibly with the aid of auxiliary coupling supports, a configuration is obtained as illustrated in FIGS. 1 and 3. In other words, a closed-loop chain whose elements 3 are linked to respective pick-up plugs, to which respective preforms are in turn associated, is obtained.

It is therefore clearly, and demonstrated, that such a chain and all elements thereof are capable of freely moving along the three-dimensional path illustrated in the Figures due to the fact that each pair of adjacent support elements are capable of rotating by 90° on a specific plane since they are hinged on a common axis Y. The same applies also to the adjacent and external support elements on the opposite sides of the above-mentioned pair of elements, which are actually capable of again rotating by an angle of 90°, but on a plane that is orthogonal to the above cited specific plane since they are hinged on respective axes situated on the orthogonal plane, of which one is represented by the axis X in FIG. 2.

The guide belt and the chain of support elements, developing into a closed-loop configuration, are configured so as to be able to transfer, by means of the pick-up plugs and therewith associated coupling elements, the plurality of preforms along a path as shown in FIG. 1. In particular, the path has at least a horizontal even curved stretch 16, in which the preforms are oriented with their neck portion turned downwards so as to accommodate the preform loading and unloading stations 4 and 5, as well as at least a different horizontal stretch 11 or 12, in which the preforms are oriented with their neck portion turned upwards (i.e., the best possible position in view of undergoing the temperature conditioning treatment).

Figure 8:
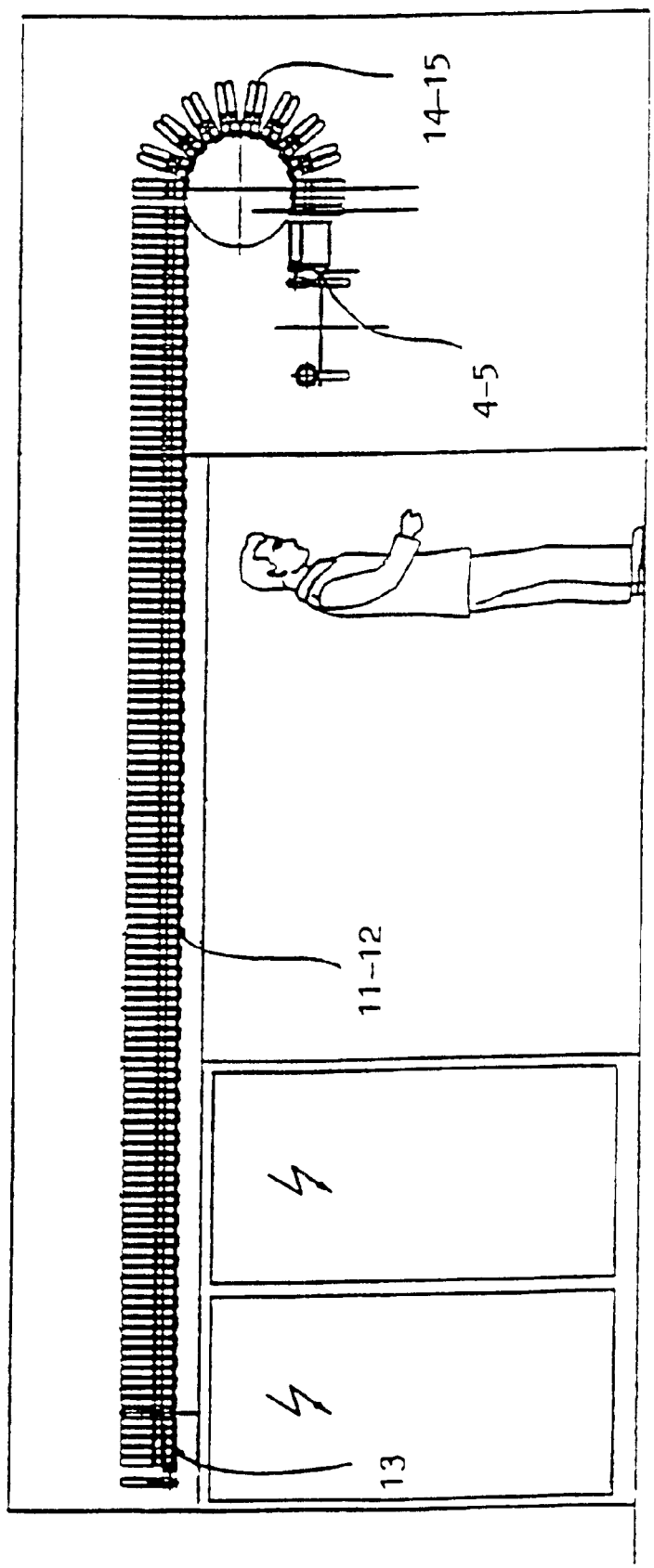
FIG. 8 is a principle vertical side projection of the apparatus illustrated in FIG. 1.

Reference should be made to FIG. 8 to better understand the basic configuration of the apparatus illustrated in FIG. 1, emphasizing the positions of the preform loading and unloading stations 4 and 5, the horizontal stretches 11 and 12 that accommodate the position of the conditioning station 6, the horizontal curved stretch 13 that joins the horizontal stretches to each other, as well as the vertical stretches 14 and 15 that are provided to turn the preforms upside down.

Figure 4:
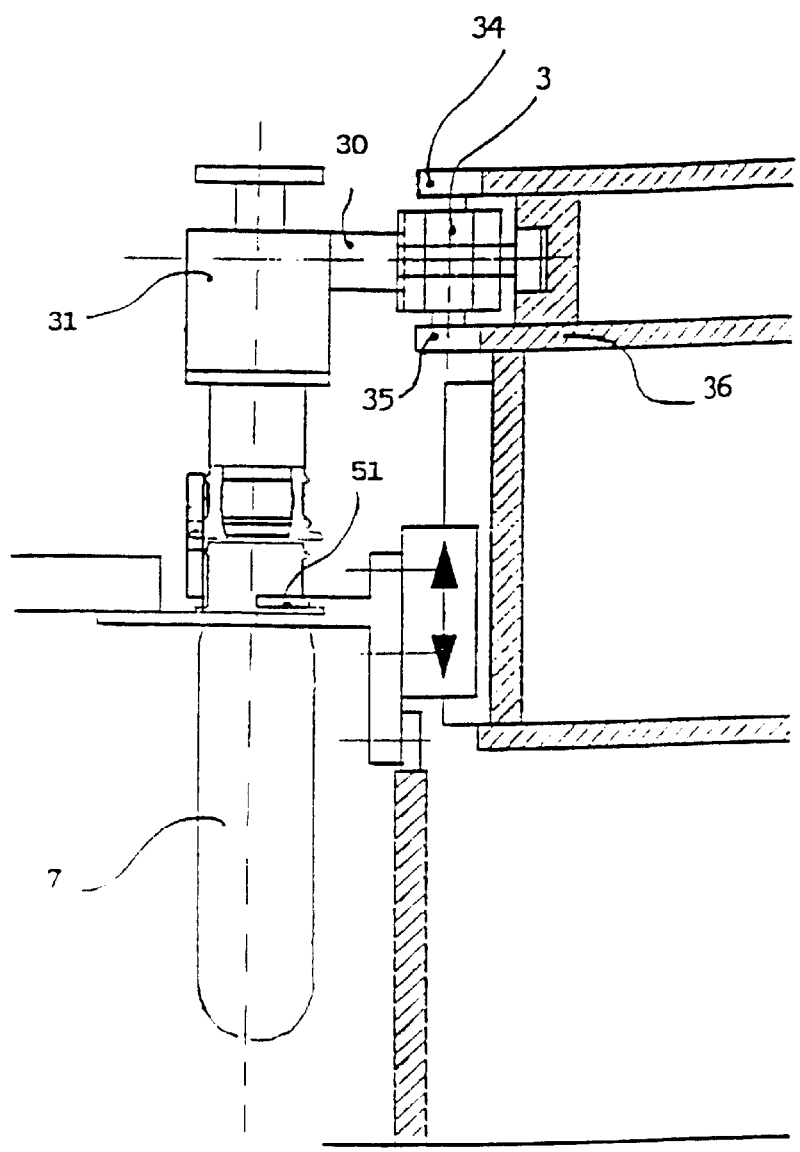
FIG. 4 is a vertical-section view of the conveyor belt, a preform, the respective pick-up plug and support and forward carrying element of the preform loading platform.
Figure 5:
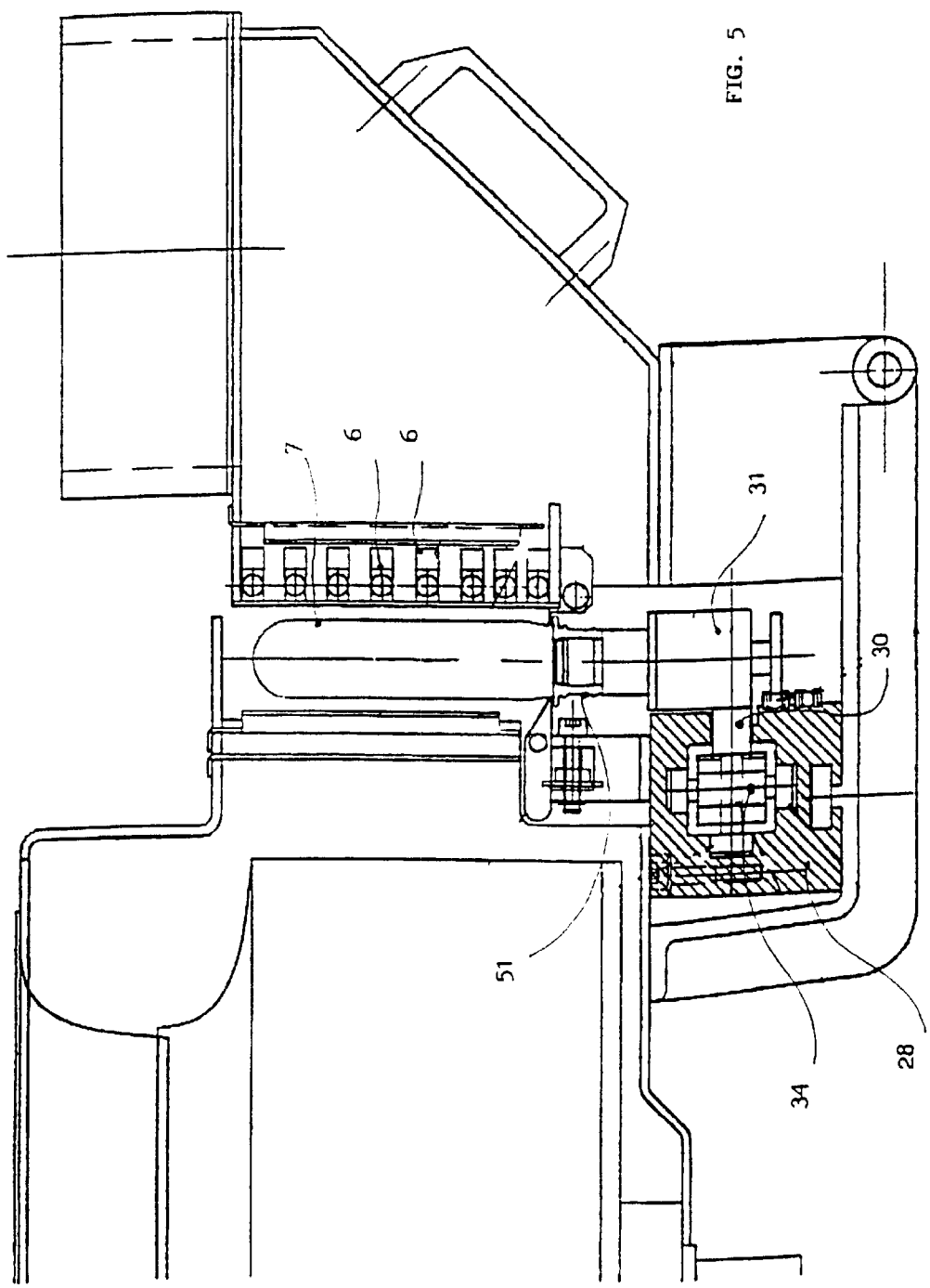
FIG. 5 is a vertical-section view of the conveyor belt, a preform, the respective pick-up plug and support and forward carrying element of the preform heating zone.

FIGS. 4 and 5 illustrate two opposite positions of the preform 7 and the therewith connected members. FIG. 4 illustrates the preform in the vicinity of the loading and unloading station, where it is in a vertical position with its neck portion 51 turned upwards, and the respective pick-up slug and support element 3 are in turn consistently oriented with respect to the belt 2. FIG. 5 illustrates the preform at a point along the heating or conditioning stretch 6 in which the preform still is in a vertical position, but with its neck portion 51 turned downwards. In this case, the respective pick-up plug and support element can be seen to be of course reversed with respect to their position in FIG. 4.

As far as the method used to drive the chain of support elements along guide belt is concerned, the same can be implemented through the use of appropriate driving means that are generally known in the art. In particular, and advantageously, in the solution exemplified in FIGS. 3, 4 and 5, such a driving motion is implemented by engaging appropriate latching means 34 and 35 provided at the ends of the pins 27 connecting adjacent support elements, as this has already been described above.

The latching means 34 and 35 are also illustrated in FIG. 4, which shows a vertical-section view of the preform, the related pick-up plug 31, the related support element 3, and the related latching means 34 and 35. These elements are shown in a position to which the preform is turned with its neck portion facing upwards (such as in the vicinity of the loading and unloading station).

Also visible in FIG. 5, namely in he dashed portion 28 thereof, is the section of the guide belt 2 that accommodates, and therefore guides, the latching means 34 and 35. In general, the guide belt 2 and the associated chain of support elements are shown in FIGS. 4 and 5, in the sense that, typically, the configurations appearing in the two figures are exhaustive of the totality of the extension and development of the apparatus. In other words, where the driving device is provided (FIG. 4), no guide belt is provided, and vice-versa (FIG. 5).

The driving means 36 engaging the latching means 34 and 35 is schematically illustrated in FIG. 4 and may consists of a traditional means like a gearwheel.

The present invention also provides an advantageous improvement, which proves particularly useful in view of making the plant even more compact. In fact, with reference to FIG. 6, the belt can enable at least two further horizontal stretches 16a and 16b to be included within the stretch 16, along which at least a part 6a, 6b of the elements of the conditioning station 6 can be arranged. Therefore, the same conditioning station can actually be subdivided into a plurality of separate and distinct portions This offers the possibility that the temperature conditioning function that such a station is called to perform can be varied according to actual needs and possibly optimized.

Figure 9:
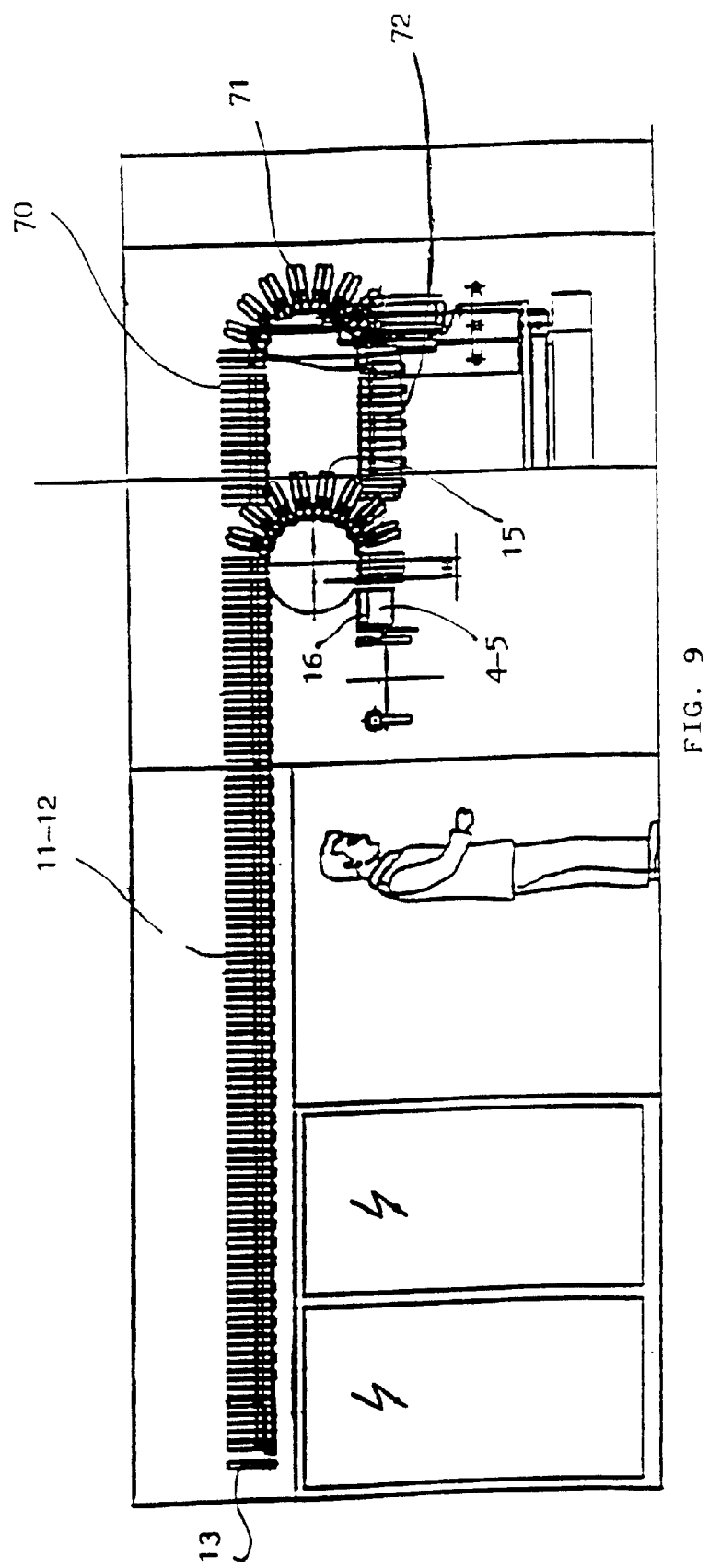
FIG. 9 is a principle vertical side projection of the apparatus illustrated in FIG. 7.

A further improvement is illustrated in FIGS. 7 and 9. In fact, considering that the preform heating phase taking place there is usually followed by a phase in which the temperature of the same preforms is levelled off, it turns out to be an advantage if the temperature levelling-off phase is carried out immediately after the heating phase, along a stretch 70 provided as an extension of the horizontal stretch 12 and related chain. Such an extension stretch 70 terminates with a vertical curved reversing stretch 71, which corresponds to the above-mentioned stretch 14 of the plant shown in FIG. 1. The chain then again joins the at least partially curved stretch 16 via a horizontal connecting stretch 72.

In practice, the plant shown in FIG. 1, where it appears to be substantially symmetrical, is to this way modified so as to only lose its symmetry, due to the extension 71, in connection with the stretch 12 along which the conditioning station 6 may be situated even partially. The extension 71 has no other function except the task of enabling the temperature of the preforms to appropriately level off before the preforms themselves are unloaded from the apparatus in order to be delivered to the subsequent blow moulding station.

The adopted solutions, although advantageous and fully feasible as far as their practical implementation is concerned, must however cope with the problem of productivity of the whole plant. Specifically, they must cope wit the problem of optimization of the productivity of the plant when conditioning preforms that may differ even significantly from each other as far as their thickness is concerned.

As more detailed explanation of the causes behind such a problem will now be provided. It is generally known that, when leaving conditioning stations, preforms usually feature a temperature that is lower on the inner surface than the temperature prevailing on the outer surface, due to commonly known reasons that do not need to be dealt with once again here. It is also generally known that carrying out the actual blow moulding phase requires optimal temperatures to prevail on both surfaces of the preforms. In particular, requires that the inner temperature be higher than or at least equal to the temperature on the outer surface. This is a requirement that clearly clashes with the above described temperature condition of the preforms as they leave the conditioning station.

It is further generally known that, in view of obtaining optimum temperature values on both inner and outer surfaces, the conditioning phase is allowed to be followed by a "temperature levelling-off" phase consisting of a period of time during which heat is neither delivered to nor removed from the preforms themselves. Therefore, temperatures spontaneously tend to become equal or even reverse during this period (inversion time). However, the actual profile of such spontaneous temperature variations depends on a number of factors, among which there is of course the duration of the levelling-off phase, the temperature prevailing at the beginning of this phase, as well as other influential parameters, such as the thickness of the preforms themselves.

In practice, at the end of the levelling-off phase, the inner and outer temperatures of the preform reach values that depend on the above cited construction and physical parameters, concerning not only the preforms themselves, but also the plant and the process.

Figure 10:
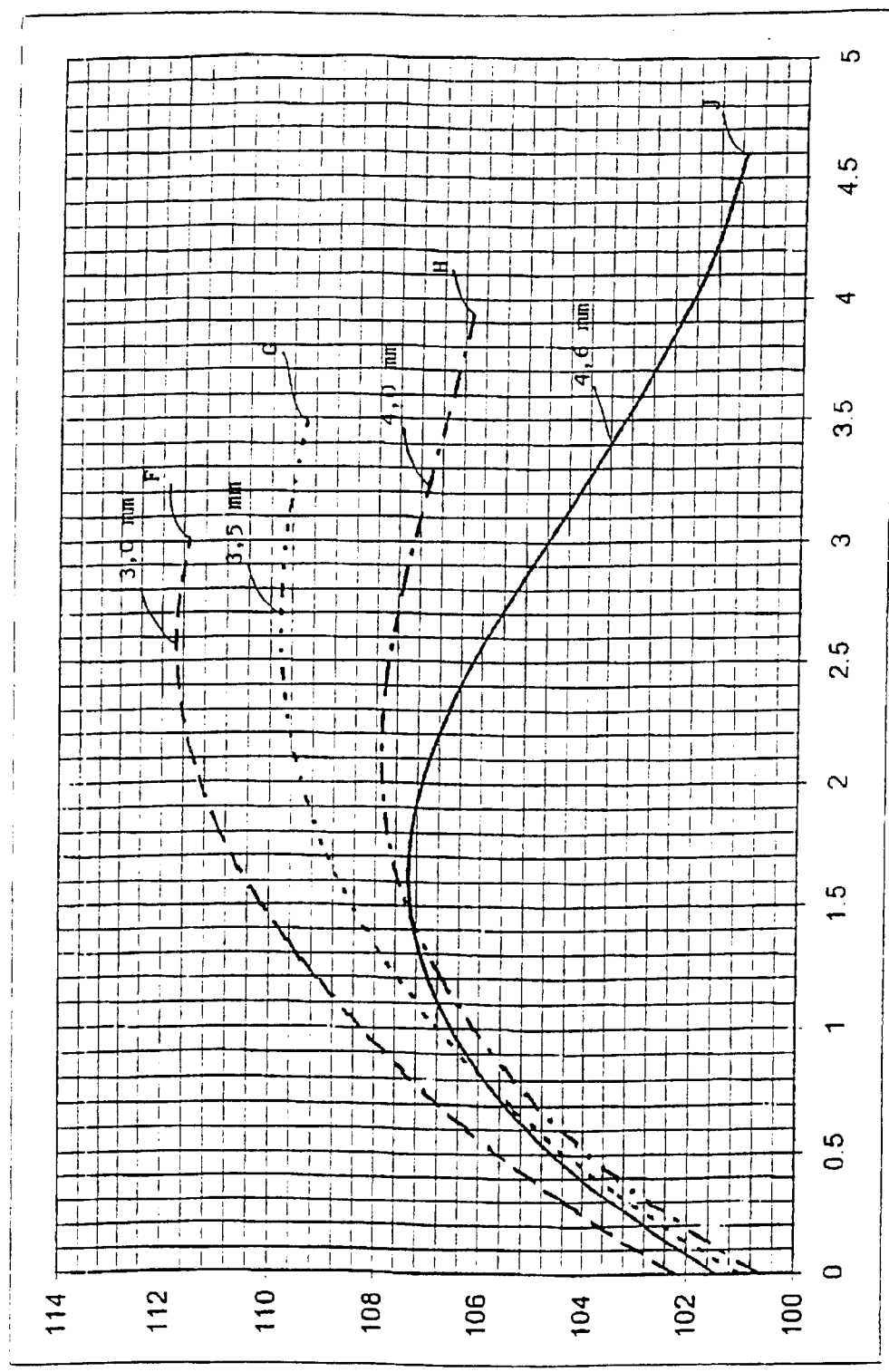
FIG. 10 is a diagrammatical view of the inner thermal profile across the wall of the preform for four different thicknesses thereof.
Figure 11:
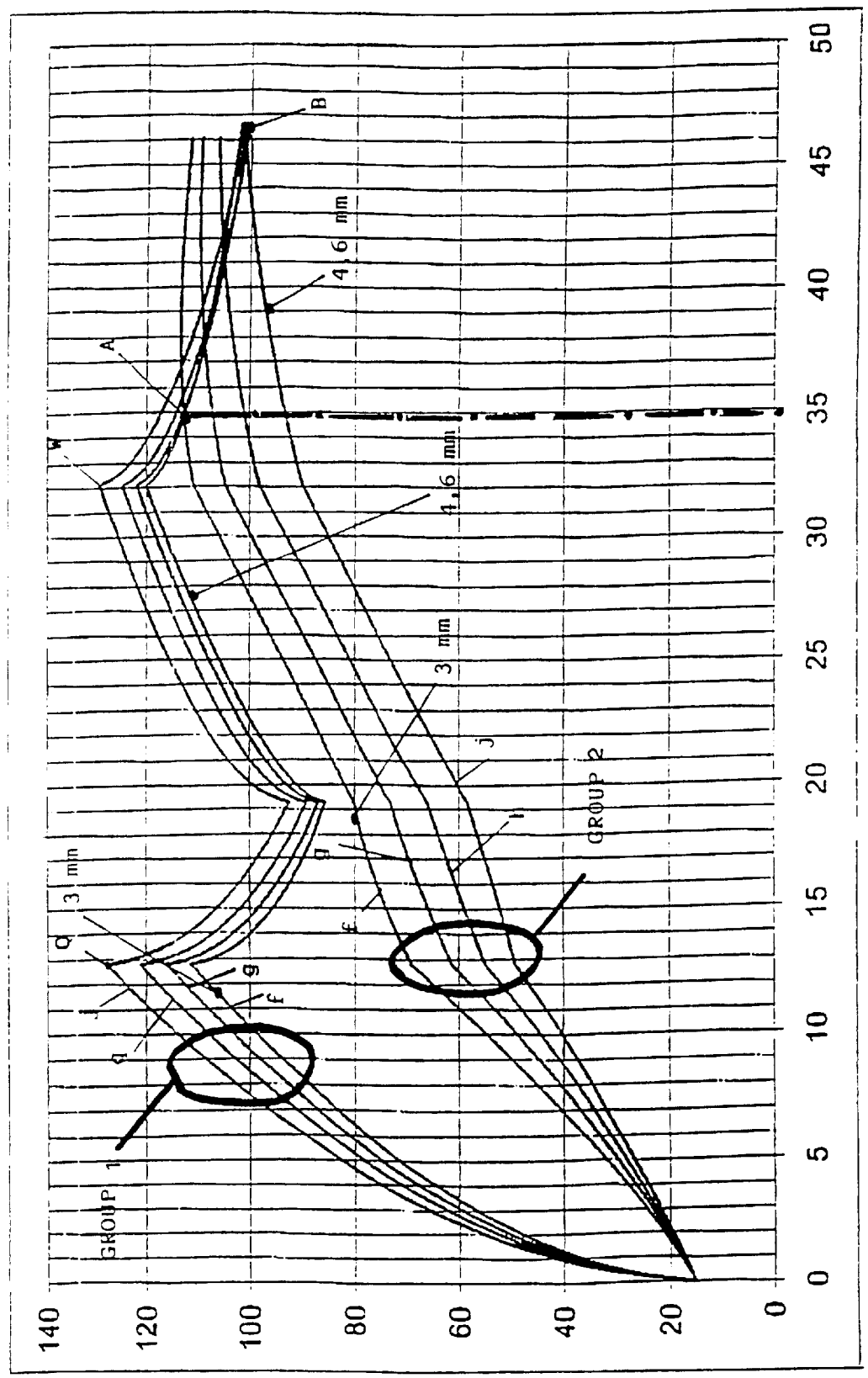
FIG. 11 is a diagrammatical view of two clusters of four curves each, referring to the transient inner and outer temperatures of four preforms having four respective thickness.

For a better explanation and understanding of the above point, reference is made to FIGS. 10 and 11. In the diagram appearing in FIG. 10, the temperatures prevailing on the inner thickness surface of four preforms having different thicknesses (duly indicated in the Figure) at the end of the temperature levelling-off phase are plotted in the ordinate. More precisely, each curve in the diagram shows the temperature of each inner point of the preform situated at a distance from die outer as indicated by the corresponding values in the abscissa. As a result, the temperatures that correspond to the value 0 in the abscissa are practically the temperatures on the outer surfaces of the respective preforms, whereas the temperatures that correspond, on the abscissa, to the terminal points F, G, H, J are the temperatures on the respective inner surfaces of the four preforms. It should be noticed that the final temperatures tend to decrease with an increasing thickness of the preform. This fact can be explained in that the more the thickness increases, the more difficult it is for the heat to diffuse through the preform. Therefore, in order to have a relatively constant temperature, the need arises for a specific levelling-offtime to be defined and complied with for each preform thickness.

This fact becomes clearer when looking at FIG. 11, which shows the outer temperatures, as defined by four curves indicated with the letters f, g, h, j and collected into the sheaf of curves indicated as "Group 1" in the Figure. The inner temperatures, defined by four further respective curves indicated by the same letters as above (since they refer to the same preform), are collected into the sheaf of curves identified as "Group 2" in the Figure. The four preforms f, g, h, j have respective different thicknesses of 3.0, 3.5, 4.0 and 4.6 mm.

What can actually be inferred from this diagram is that the temperature inversion point (i.e., the moment at which, during the leveling-offphase, the decreasing outer temperature lowers to the value of the contemporaneously increasing inner temperature) is identified in the instant application as point A and occurs after approx. 35 seconds for the thinnest preform f (i.e., the preform with a thickness of 3.0 mm). In contrast, the inversion point for the thickest preform j (i.e., the preform with a thickness of 4.6 mm) is reached after as many as approx. 47 seconds, at the instant identified as point B in the Figure, with an increase of approx. 12 seconds in the levelling-off time required. In the graph of FIG. 11, it can also be verified that the preforms with intermediate thickness values reach inversion points after periods of time that are between the above cited minimum and maximum duration.

In connection with the above cited FIG. 11, it should be further explained that the two peals reached by the temperatures at Q and W along the evolution curve thereof depend on the fact that the conditioning process is carried out in two distinct and subsequent phases, separated from each other by a short tune interval. Therefore, the method and apparatus can deliver the total required amount of heat, without causing the outer temperature of the preforms to rise to any excessive extent.

Since construction and process parameters are generally pre-set and defined at the actual design engineering stage, they usually prove difficult, if not impossible, to modify during production. Therefore, these parameters can be harmonized and purposedly set in view of optimizing the overall result (i.e., not only as far as the quality of the preforms is concerned, but also in strictly production-related terms, solely for a particular type of preforms. Consequently, the result that will be obtained for any other type of preform will unavoidably be just an acceptable compromise.

In fact, if preforms of a certain, relatively thin thickness are used, all other plant and process parameters remaining unaltered, the temperature inversion time will have a given duration. If preforms with a considerably greater thickness are however processed in the same plant, then the respective inversion time required to bring these preforms to the desired blow moulding conditions will increase accordingly, as this has been documented above. However, for such an increase in the inversion time to be brought about, the need arises, considering the constancy of the dimensions of the plant, for the speed at which the preforms are moving along to be reduced. Consequently, a proportionately reduced productivity of the same slant results.

In view of doing away with such a drawback, mention is made here again of the fact that, according to the present invention, the plant of the invention also comprises the horizontal stretch 12 that may be extended by an additional stretch 70 in order to enable the preforms to undergo a temperature levelling-off upon leaving said horizontal stretch 12.

The present improvement relates to the possibility that the geometry of the closed-loop belt carrying the pick-up plugs can be varied, albeit with several limitations. First, the overall length of the belt remains unaltered, so that the same belt can be used even without the present improvement. Secondly, the arrangement of the horizontal stretches on the two distinct parallel horizontal planes (two stretches per plane and, therefore, four horizontal stretches in total) remains substantially unaltered, except for what will be set forth further on. Thirdly, the two curved stretches 13 and 16 arranged on the two horizontal planes and connecting the two pairs of horizontal stretches remain unaltered.

The improvement lies in the possibility that two horizontal stretches can be extended in their length downstream of a conditioning station. As a result, another stretch situated on a different parallel horizontal plane can be made shorter, so as to make it possible for a variable-length overall path. Therefore, for the same forward moving speed of the belt, a variable temperature levelling-off time can be obtained before the preforms are allowed to reach their unloading station.

Figure 12C:
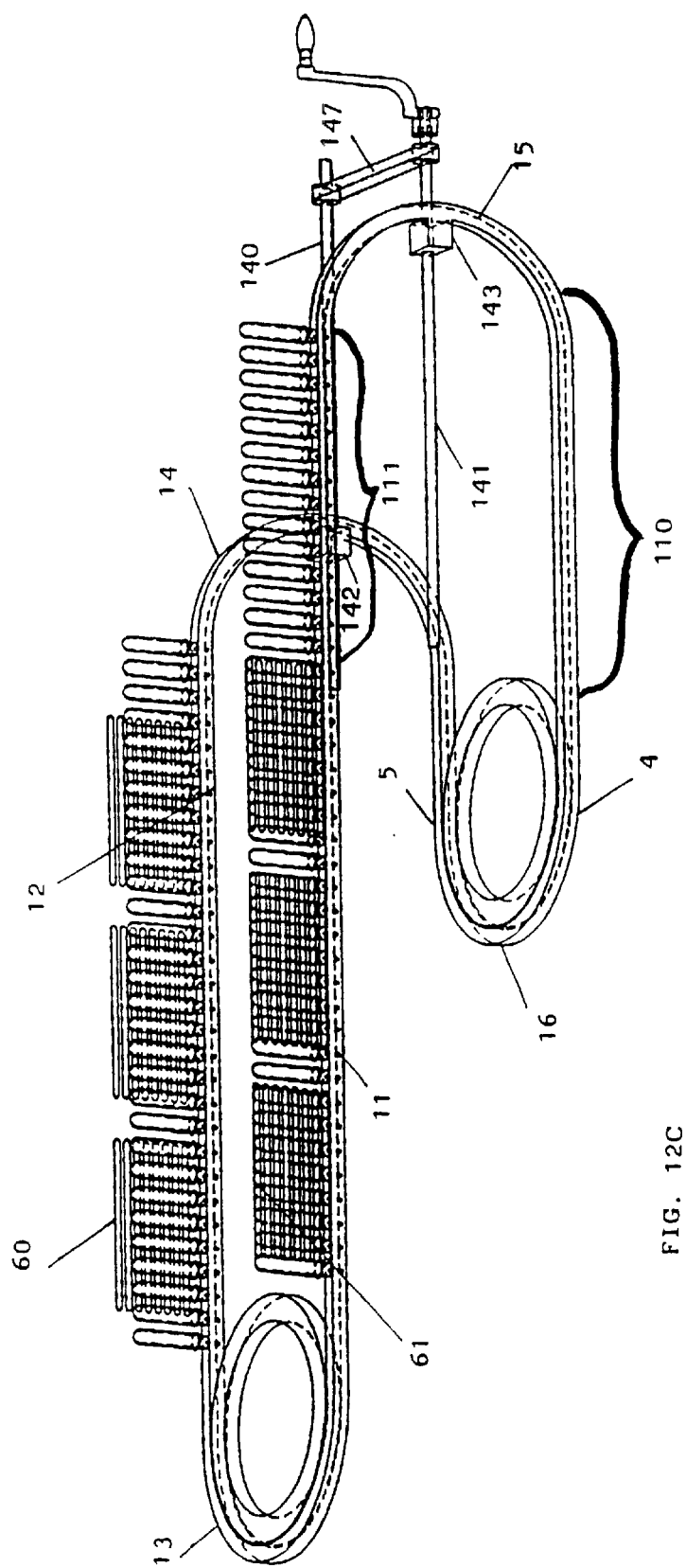

With reference to the set of FIGS. 12 and 13, FIG. 12C can in particular be seen to illustrate an arrangement in which along two horizontal stretches situated on the same plane there are provided two distinct conditioning stations 60 and 61 that are associated with the two belt stretches 12 and 11, respectively. In order to be able to join the horizontal stretch 12 to the curved stretch 16 situated on a parallel plane, a stretch 14 curved by half a round angle on the vertical plane is provided. It should further be noticed that, upon turning by half a round angle (180°) on the vertical and having so moved onto the lower parallel horizontal plane, the preforms practically do not need to move along (i.e., cover any further stretch) since they are immediately intercepted by the unloading station 5 arranged at the beginning of the curved horizontal stretch 16. It should also be noted that, upon being loaded at the loading station 4, the preforms must move along the two horizontal stretches 110 and 111, which are situated on the two parallel plane, and the vertical curved stretch 15 that loins them to each other. However, when so moving along this path, the preforms do not undergo any conditioning and/or treatment of any kind. Therefore, the actual length of the stretches 110, 15 and 111 has no relevance to treatment purposes and, therefore, does not affect the properties of the preforms. With the illustrated arrangement, therefore, the preforms are practically picked up by the unloading station 5 almost immediately upon the conclusion of the conditioning treatment in the conditioning station 60.

Figure 13C:
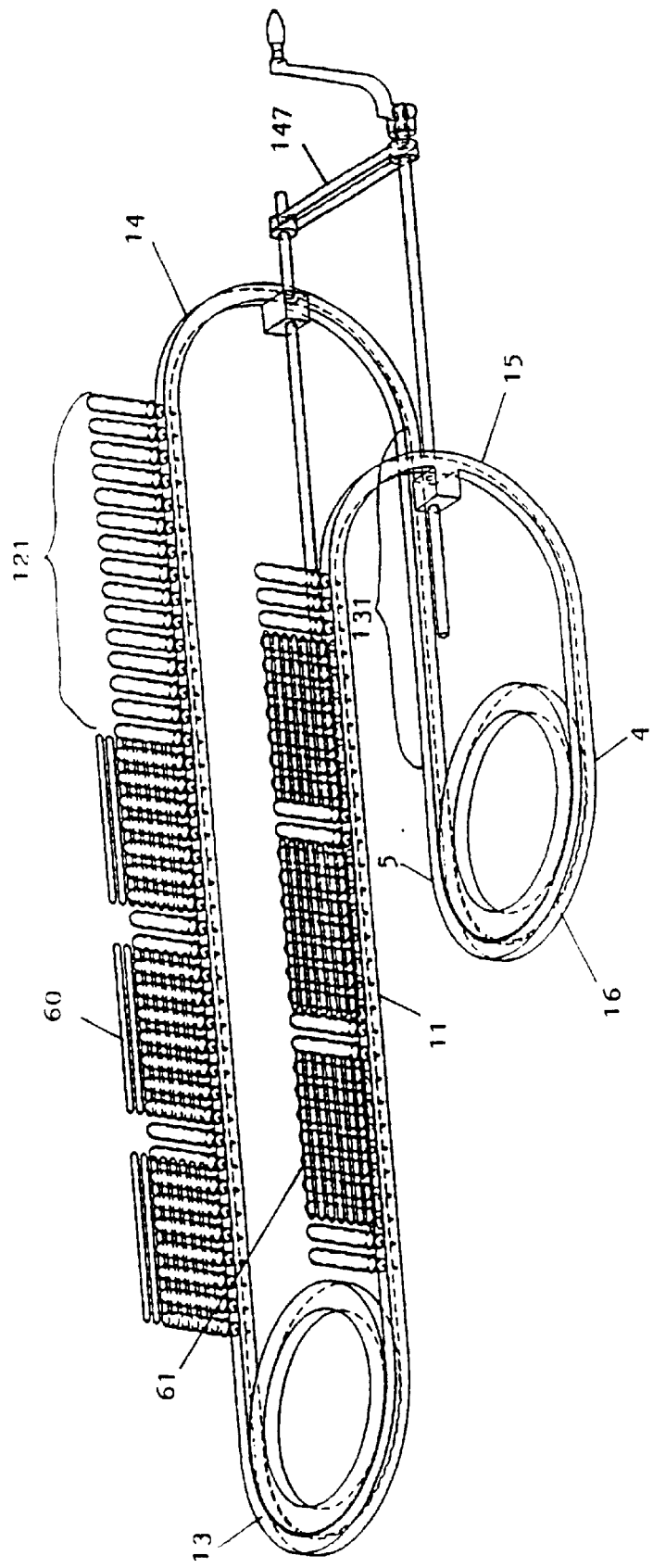

In the illustration appearing in FIG. 13C, it can be noticed that the apparatus shown there is substantially similar to the one illustrated in FIG. 12C. However, there are several differences between the embodiments. In the first modification refers to the path followed by the belt from the exit of the conditioning station 60 to the entrance into the unloading station 5. However, in the case of the apparatus in FIG. 12C, such a path merely comprises the curved stretch 101. In the case of the apparatus of FIG. 13C this path also includes a rectilinear horizontal stretch 121 that follows the conditioning station 60 and immediately precedes the curved stretch 14, and a second rectilinear horizontal stretch 131 that immediately follows the curved stretch 14 and precedes the unloading station 5.

It will be readily appreciated that, since the conditioning station 60 and the unloading station 5 keep their position in relation to each other due to the fact that they are firmly joined to the same carrying structure, the length of the added stretches 121 and 131 must be the same. Due to this reason, as well as to the constancy of the mutual positions of the curves stretches 13 and 16 and the conditioning stations 60 and 61 in relation to each other, and finally also due to the constancy of the overall length of the closed-loop belt acting as a guide for the preform pick-up plugs, it ensues that the lengths of the afore described stretches 110 and 111 are nullified. In fact, due to the length of the belt being constant, any modification in the development thereof in a given stretch makes it necessary for its development in another stretch to be modified accordingly. Since the stretches that can be modified are only the ones that are not affected by the curved stretches 13 and 16 and the conditioning stations 60 and 61, it ensues as a logical consequence that the pairs of stretches 110 and 111 (illustrated in a limiting configuration thereof), and the stretches 121 and 131 (in the opposite limiting configuration), can compensate each other, of course within the limits as set and described above.

It is therefore possible, and obvious, for supplementary stretches 121 and 131 to be inserted between the conditioning station and the unloading station. Thus, the supplementary stretches can then enable the time during which the preforms are allowed to level off their temperature before reaching the unloading station to be extended, since the forward moving speed of the belt remains constant.

On the other hand, it also appears quite obvious that such a possibility for the length or duration of the supplementary temperature levelling-off time to be modified must be appropriately calibrated in accordance with the actual needs. This will depend on a number of factors, such as mainly the speed of the belt, the thickness of the preforms and the desired extent of levelling-off, and this has already been discussed earlier in this description. It therefore is of paramount importance to be able to rely on the possibility for the temperature levelling-off time to be modified, between the conditioning station and the unloading station, within two pre-settable limit values. The levelling-off time can of course be varied by accordingly modifying the length of the variable-length stretches 110, 111 and 121, 131 with respect to each other.

Figure 14:
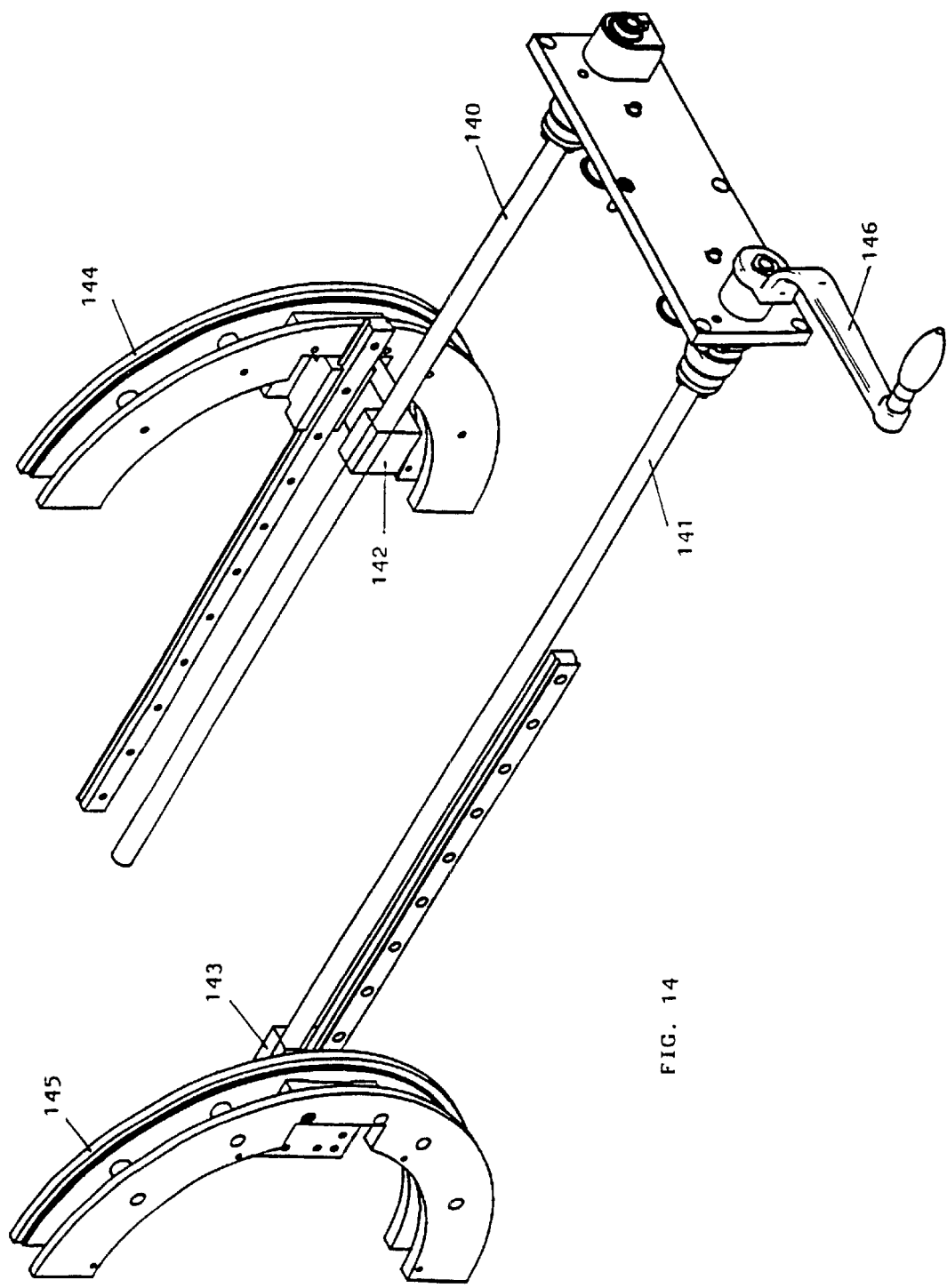
FIG. 14 is a perspective view of a portion of the apparatus shown in FIGS. 12A and 13A.

Such a possibility can be brought about through the use of a device 140, as illustrated symbolically in the Figures and, in particular, to FIG. 14. This device comprises two actuation rods 140 and 141 which, in a preferred manner, are threaded externally and are capable of engaging respective blocks 142 and 143 associated to the guides 144 and 145 that lead said belt into the curved stretches; an actuation member 146 adapted to cause the actuation rods 140 and 141 to rotate contemporaneously, possibly through a belt-like or chain-like connecting means or similar appropriate means 147, wherein the rods 140, 141 the actuation member 146, and the connecting means 147 for transmitting the actuation to the rods are firmly joined to the common structure carrying the curved stretches 13 and 16 and the conditioning stations.

At this point in the description, one skilled in the art is fully capable of readily understanding how the apparatus according to the present invention actually operates. In fact, after setting the apparatus for a given type of preforms, a defined forward moving speed of the conveyor belt, as well as a certain temperature levelling-off time (which is in turn dependent on the desired temperature variations), it becomes readily possible for the overall length, and therefore the length of the individual variable-length stretches 121 and 131, to be calculated and said actuation member 146 to be then acted upon so as to enable said blocks 142 and 143 to correspondingly slide with respect to the respective actuation rods 140 and 141. Due to the fact that such actuation rods are firmly associated spatially with the structure of the plant and that the blocks are linked to the respective guides 144, 146, the result is a displacement of the blocks and, therefore, the respective guides, with respect to the structure itself of the plant. This leads to a corresponding variation in the overall development geometry of the conveyor belt carrying the preform pick-up plugs and, in particular, to a prolongation of the stretches 121 and 131 and a corresponding shortening of the stretches 110 and 111, since the overall length of the belt is constant. In the opposite case, shorter stretches 121 and 131 will correspond to similarly longer stretches 110 and 111.

From the above description and the various examples set forth therein, the possibility becomes readily apparent for the various stretches making up the guiding belt to be so redistributed as to obtain an overall length of the stretches 121 and 131 adapted to be covered by the preforms in a period of time that corresponds to the actual levelling-off time desired.

The above described improvement, therefore, allows the possibility that the same preform conditioning and temperature levelling-off apparatus can be most readily, simply and economically used to connection with preforms that may differ even to a considerable extent from each other, without any particular implementation-related difficulty.

Those skilled in the art will also be readily able to appreciate that the above embodiments have been described and illustrated in a symbolical manner, since embodiments can be readily imagined that may be even more respondent to usual construction standards. In particular, the actuation member 146 may be advantageously obtained in a motor appropriately adapted to be controlled by means of feedback signals that are indicative of the position of the blocks 142 and 143. Such a position of the blocks may of course be determined even independently through autonomous controls, provided that the above constraints and limits are duly complied with.

Although the invention has been described herein based on the example of preferred embodiments thereof and a generally known terminology, it shall not be intended as being limited thereby, since it is well within the ability of anyone skilled in the art to develop a number of variants from the teachings thereof. The appended claims shall therefore be understood as covering all such possible obvious modifications that are within the ability of those skilled in the art, and do not depart from the actual scope of the present invention.

What is claimed is:

1. An apparatus for continuously transferring preforms, comprising:
   a closed-loop conveyor chain formed of a plurality of support elements for carrying the preforms, each of said support elements having a pick-up plug for picking-up, holding, and releasing a respective preform, said conveyor chain being operable to be driven in a continuous motion;
   a closed-loop conveyor belt for guiding said conveyor chain, said conveyor belt including:
      a first horizontal stretch;
      a second horizontal stretch parallel to said first horizontal stretch;
      a first curved stretch arranged on the same horizontal plane as said first horizontal stretch and said second horizontal stretch and arranged to connect an end of said first horizontal stretch to an end of said second horizontal stretch;
      a second curved stretch shaped as a half-circle and arranged in a first vertical plane and extending into said first horizontal stretch;
      a third curved stretch shaped as a half-circle and arranged in a second vertical plane and extending into said second horizontal stretch; and
      a fourth curved stretch on a horizontal plane and connected to an end of said second curved stretch and an end of said third curved stretch;
   a loading station for loading the preforms onto said support elements;
   an unloading station for separating the preforms from said support elements, said loading station and said unloading station being arranged along said conveyor belt such that a preform can be picked-up by and released from a respective one of said pick-up plugs while the preform is in a vertical position and a neck portion of the preform is turned upwards;
   a temperature conditioning station provided along said conveyor belt between said loading station and said unloading station so as to treat the preforms carried by said support elements; and
   a moving component for moving said conveyor chain including said support elements forward along said conveyor belt, each of said support elements being operable to rotate as said moving component moves said conveyor chain such that when each of said support elements is moved through said temperature conditioning station, a respective preform carried by said each of said support elements is in a vertical position and a neck portion of the preform is turned downwards.

2. The apparatus of claim 1, wherein adjacent support elements are linked so as to form said conveyor chain, said support elements being linked so as to be alternately oriented at 90° angles.

3. The apparatus of claim 1, wherein said support elements are similar.

4. The apparatus of claim 1, wherein said fourth curved stretch comprises a rectilinear stretch, a portion of said temperature conditioning station being arranged at said rectilinear stretch.

5. The apparatus of claim 1, wherein said moving component includes a gearwheel acting on said conveyor chain only at an interruption in said conveyor belt at said first curved stretch.

6. The apparatus of claim 1, wherein said conveyor belt is adapted to have a variable configuration with respect to said temperature conditioning station, said first curved stretch, and said fourth curved stretch such that a variable-length path between said temperature conditioning station and said unloading station can be formed.

7. The apparatus of claim 6, wherein said variable length path comprises a total variable length path, a length of said total variable-length path being determined by a sum of a length of a first variable-length path and a length of a second variable-length path.

8. The apparatus of claim 7, wherein said first variable-length path has a length equal to a length of said second variable-length path.

9. The apparatus of claim 7, wherein said first variable-length path is located downstream of said temperature conditioning station and upstream of said second curved stretch, said second variable-length path being located downstream of said second curved stretch and upstream of said unloading station.

10. The apparatus of claim 9, wherein said first variable-length path and said second variable-length path have a length amounting substantially to zero.

11. The apparatus of claim 7, further comprising an actuation device for varying a length of each of said first variable-length path and said second variable-length path, said actuation device including:
a pair of actuating rods;
a pair of blocks linked to said conveyor belt so as to support said second curved stretch and said third curved stretch and engaging said pair of actuating rods, said actuating rods and said blocks being operable to vary a length of said first variable-length path and said second variable-length path arranged on opposite sides of said second curved stretch.

12. The apparatus of claim 11, wherein said actuation device further includes an actuation member for rotating said actuating rods, said blocks engaging said actuating rods such that said blocks are displaced when said actuating rods are rotated.

13. The apparatus of claim 1, wherein said loading station and said unloading station are arranged along said fourth curved stretch.

14. The apparatus of claim 1, wherein each of said support elements includes a first coupling portion for pivoting along an X-axis and a second coupling portion for pivoting along a Y-axis, said first coupling portion and said second coupling portion being arranged on opposite sides of each support element so as to be oriented orthogonally with respect to each other, adjacent support elements being linked by a pin inserted through said first coupling portion and said second coupling portion of said adjacent support elements, respectively.

15. The apparatus of claim 14, wherein said first coupling portion comprises two parallel tabs each having a through-hole for allowing said pin to be inserted therethrough, said second coupling portion comprising a protrusion having a through-hole for allowing said pin to be inserted therethrough, said protrusion being adapted to fit between said two parallel tabs of an adjacent support element such that said pin inserted through said through-hole of each of said parallel tabs and through said through-hole of said protrusion links said support elements.

16. The apparatus of claim 15, wherein each of said support elements is rigidly connected to a respective pick-up plug.

17. The apparatus of claim 1, wherein said moving component includes a hauling device for dragging each of said support elements around said conveyor belt, each of said support elements having a latching device for engaging said hauling device.

18. The apparatus of claim 17, wherein said conveyor belt is adapted such that when each of said support elements is at said first horizontal stretch and said second horizontal stretch, a neck portion of the preform carried by said each of said support elements is turned downwards, at least a portion of said temperature conditioning station is arranged along one of said first horizontal stretch and said second horizontal stretch.

19. The apparatus of claim 17, wherein said conveyor chain includes a plurality of pins for linking said support elements, wherein said latching device of each of said support elements is located at end portions of each of said pins.

20. An apparatus for continuously transferring preforms, comprising:
a closed-loop conveyor chain formed of a plurality of support elements for carrying the preforms, each of said support elements having a pick-up plug for picking-up, holding, and releasing a respective preform, said conveyor chain being operable to be driven in a continuous motion;
a closed-loop conveyor belt for guiding said conveyor chain, said conveyor belt including:
a first horizontal stretch;
a second horizontal stretch parallel to said first horizontal stretch, said second horizontal stretch having an extension stretch for allowing the preforms to undergo a temperature leveling-off phase;
a first curved stretch shaped as a half-circle and arranged in a first vertical plane at an end of said first horizontal stretch;
a second curved stretch shaped as a half-circle and arranged in a second vertical plane at an end of said extension stretch of said second horizontal stretch; and
a third curved stretch on a horizontal plane and connected to an end of said first curved stretch and an end of said second curved stretch;
a loading station for loading the preforms onto said support elements;
an unloading station for separating the preforms from said support elements, said loading station and said unloading station being arranged along said conveyor belt such that a preform can be picked-up by and released from a respective one of said pick-up plugs while the preform is in a vertical position and a neck portion of the preform is turned upwards;
a temperature conditioning station provided along said conveyor belt between said loading station and said unloading station so as to treat the preforms carried by said support elements; and
a moving component for moving said conveyor chain including said support elements forward along said conveyor belt, each of said support elements being operable to rotate as said moving component moves said conveyor chain such that when each of said support elements is moved through said temperature conditioning station, a respective preform carried by said each of said support elements is in a vertical position and a neck portion of the preform is turned downwards.

21. The apparatus of claim 20, wherein said loading station and said unloading station are arranged along said third curved stretch.

22. The apparatus of claim 20, wherein each of said support elements includes a first coupling portion for pivoting along an X-axis and a second coupling portion for pivoting along a Y-axis, said first coupling portion and said second coupling portion being arranged on opposite sides of each support element so as to be oriented orthogonally with respect to each other, adjacent support elements being linked by a pin inserted through said first coupling portion and said second coupling portion of said adjacent support elements, respectively.

23. The apparatus of claim 22, wherein said first coupling portion comprises two parallel tabs each having a through-hole for allowing said pin to be inserted therethrough, said second coupling portion comprising a protrusion having a through-hole for allowing said pin to be inserted therethrough, said protrusion being adapted to fit between said two parallel tabs of an adjacent support element such that said pin inserted through said through-hole of each of said parallel tabs and through said through-hole of said protrusion links said support elements.

24. The apparatus of claim 23, wherein each of said support elements is rigidly connected to a respective pick-up plug.

25. The apparatus of claim 20, wherein said moving component includes a hauling device for dragging each of said support elements around said conveyor belt, each of said support elements having a latching device for engaging said hauling device.

26. The apparatus of claim 25, wherein said conveyor belt is adapted such that when each of said support elements is at said first horizontal stretch and said second horizontal stretch, a neck portion of the preform carried by said each of said support elements is turned downwards, at least a portion of said temperature conditioning station is arranged along one of said first horizontal stretch and said second horizontal stretch.

27. The apparatus of claim 25, wherein said conveyor chain includes a plurality of pins for linking said support elements, wherein said latching device of each of said support elements is located at end portions of each of said pins.

\* \* \* \* \*